United States Patent Office 3,062,722
Patented Nov. 6, 1962

3,062,722
THERAPEUTIC 2-AMINOETHANETHIOL ORATE
Domenico Garofalo, Via Frasconi 15, Novara, Italy
No Drawing. Filed June 13, 1960, Ser. No. 35,401
Claims priority, application Italy Mar. 15, 1960
9 Claims. (Cl. 167—95)

The present invention relates to a cysteamine salt and more particularly to the cysteamine orotate or 2-aminoethanethiol uracil-4-carbossilate as well as to the process for the preparation thereof.

The same invention also intends to protect the application of said salt as medicament in the treatment of liver diseases as well as in the prevention and treatment of injuries due to the X-ray therapy.

The present invention is based on the recent and well known researches about the therapeutical applications of the 2-aminoethanethiol and of the orotic acid taken separately. At the present time the action of the 2-aminoethanethiol in the prevention and treatment of the X-ray injuries, of the acute and subacute intoxication by the heavy metals and as necrotropic agent in the injuries of the liver parenchym has been widely proven to be successful. In its turn the orotic acid has found brilliant therapeutical applications in the field of liver diseases: in fact the role it plays in the metabolism of the nucleic acids and of the proteins make is particularly suitable in those liver diseases wherein it is necessary to reintegrate the RNA patrimony and thus reinstate the depressed proteic syntheses (eutrophic action of the orotic acid with respect to the epatocite).

The applicant states that the 2-aminoethanethiol orotate comprises both the therapeutical properties of its two components and to therapeutical purposes it is particularly useful in the treatment of hepatopathies (liver diseases) due to exogen and endogen intoxications and especially in the clinical situations wherein an hepatic regeneration is required.

From the chemical point of view the 2-aminoethanethiol orotate has the great advantage of being considerably more stable with respect to oxidation phenomena than the 2-aminoethanethiol salts commonly used up to now for therapeutical purposes as for instance the chlorhydrate, sulphate, salicylate, tartrate, benzoate, whereby its application is certainly preferable.

Furthermore the 2-aminoethanethiol orotate is not hygroscopic, this property being a further advantage for what the application of this salt is concerned.

The 2-aminoethanethiol orotate is preferably prepared by having the orotic acid act, in suspension, in the 5–30% aqueous solution of 2-aminoethanethiol.

For better illustrating the object of the present invention some embodiments means to be illustrative only and not limitative in the least, are described in the following specification.

Example I 156.1 grams of orotic acid in fine powder are added to 10 liters of 14.4% aqueous solution of 2-aminoethanethiol warmed up to 80°–90° C.

The whole is continuously stirred, while being held for two hours in a nitrogen stream and in a steam bath at 70°–80° C. Hereafter still under stirring and nitrogen stream it is cooled down until it reaches room temperature.

Upon filtration on Buchner the precipitate is washed on the filter with cold water and thereafter with a little cold anhydrous ether, and finally it is dried in an oven under vacuum at 35°–60° C.

The obtained product is white, little soluble in water. Its melting point is 270°–275° C. and its iodometric titer 98°–99°. Its composition is:

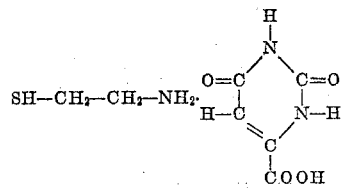

It contains 33% 2-aminoethanethiol and 67% orotic acid.

The 2-aminoethanethiol orotate alone or taken in combination with other medicaments may be used for the preparation of various pharmaceutical remedies in the form of capsules, tablets, extemporaneous syruplike suspensions, injectable suspensions and so on.

Example II

| Tablets | I, mg. | II, mg. |
| --- | --- | --- |
| 2-aminoethanethiol orotate | 100 | 75 |
| choline bitartrate |  | 100 |
| ascorbic acid | 10 |  |
| methionine |  | 100 |
| lactose | 60 | 50 |
| wheat starch | 25 | 25 |
| talc | 5 | 10 |

Example III

| Coated tablets | I | II |
| --- | --- | --- |
| 2-aminoethanethiol orotate mg | 100 | 75 |
| pentaerythrite mg | 100 |  |
| nicotinamide mg | 25 |  |
| cyanocobalamine | 50γ |  |
| liver concentrate mg | 50 |  |
| d.l. methionine mg |  | 100 |
| betaine monohydrate mg |  | 50 |
| inositol mg |  | 100 |
| dehydrocholic acid mg |  | 50 |
| tri-choline citrate mg |  | 75 |
| folic acid mg | 0.2 |  |

The tablets, suitably shaped, may be coated with a film of sugar, arabic gum, methyl cellulose and so on according to the conventional processes in use.

It is also possible to prepare coated enteric tablets.

Example IV

| Syrup | I | II |
| --- | --- | --- |
| 2-aminoethanethiol orotate g | 1 | 1.5 |
| inositol g | 2.5 |  |
| d.l. methionine (acetil) g | 1 |  |
| betaine monohydrate g | 0.5 | 1 |
| nicotinamide g | 0.25 | 0.25 |
| pentaerythrite g |  | 5 |
| cyanocobalamine | 250γ | 500γ |
| liver concentrate g | 2 | 2 |
| tri-choline citrate g | 2 | 2 |
| folic acid mg |  | 2 |

Saccharose, adragant gum, polisorbate 80, aroma and color are added in a sufficient quantity.

The sugared and aromatized powder must be diluted with distilled water when the medicament is taken and hence it has to be stirred to give a stable and agreeable suspension.

Example V

Injectable suspension:

|  | Mg. |
| --- | --- |
| 2-aminoethanethiol orotate (fine powder) | 500 |
| Sodium carboxymethylcellulose (medium viscosity) | 25 |
| NaCl | 40 |
| Polisorbate 80 | 0.3 |

The homogeneous and sterile powder must be suspended before injection in 5 ml. apyrogenic distilled water.

The previously described invention as well as its possible applications are meant to fall within the scope of the appended claims.

What I claim is:

1. A 2-aminoethanethiol salt characterized in that it is a cysteamine orotate having the following formula:

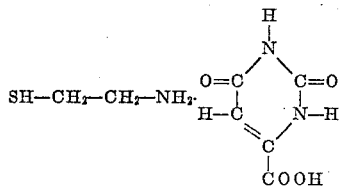

2. The process for the preparation of the product of claim 1, characterized in that the orotic acid is made to react, in suspension, in a 5–30% aqueous solution of 2-aminoethanethiol with stirring in the presence of an inert gas stream while being held in a steam bath at a temperature of 70°–90° C.

3. Pharmaceutical compositions comprising the cysteamine orotate having the following formula:

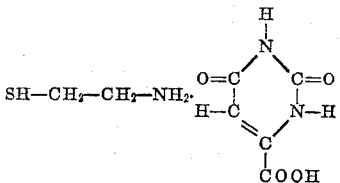

4. Pharmaceutical compositions comprising cysteamine crotate as set forth in claim 3, combined with compounds have a synergistic action therewith.

5. Pharmaceutical compositions comprising cysteamine orotate as set forth in claim 3, combined with vitamins having a synergistic action therewith.

6. A method for treating patients exhibiting hepatic syndromes which comprises administering to said patients, cystamine orotate.

7. A method for the prevention and treatment of X-ray injuries which comprises administering to patients exposed, thereto, cystamine orotate.

8. A method for treating patients exhibiting hepatic syndromes which comprises administering to said patients, pharmaceutical compositions comprising cystamine crotate as set forth in claim 3, combined with compounds having a synergistic action therewith.

9. A method for the prevention and treatment of X-ray injuries which comprises administering to patient exposed thereto, pharmaceutical compositions comprising cysteamine crotate as set forth in claim 3, combined with compounds having a synergistic action therewith.

References Cited in the file of this patent

Chem. Abst., vol. 51, 1957, 3016a.
Chem. Abst., vol. 51, 1957, 12997t.
Chem. Abst., vol. 52, 1958, 5661d.
Chem. Abst., vol. 52, 1958, 1873s.